US006934002B1

(12) United States Patent
Setteducati

(10) Patent No.: US 6,934,002 B1
(45) Date of Patent: Aug. 23, 2005

(54) SYSTEM FOR INTERACTIVE DISPLAY OF A MAGIC SHOW

(76) Inventor: Mark Setteducati, 218 E. 17 St., New York City, NY (US) 10003

( * ) Notice: Subject to any disclaimer, the term of this patent is extended or adjusted under 35 U.S.C. 154(b) by 0 days.

(21) Appl. No.: 10/286,596

(22) Filed: Nov. 1, 2002

(51) Int. Cl.$^7$ .......................... G03B 19/18; H04N 7/16
(52) U.S. Cl. ...................... 352/133; 725/138; 725/139
(58) Field of Search ...................... 352/133; 725/138, 725/139

(56) References Cited

U.S. PATENT DOCUMENTS

| 4,507,680 | A | * | 3/1985 | Freeman ..................... 725/139 |
| 5,600,368 | A | * | 2/1997 | Matthews, III ............. 348/143 |
| 5,861,881 | A | * | 1/1999 | Freeman et al. ......... 715/500.1 |
| 5,894,320 | A | * | 4/1999 | Vancelette .................. 725/138 |
| 6,289,165 | B1 | * | 9/2001 | Abecassis ................... 386/46 |

FOREIGN PATENT DOCUMENTS

EP          1021036 A2  *  7/2000  ............ H04N 7/16

* cited by examiner

Primary Examiner—Rodney Fuller
(74) Attorney, Agent, or Firm—Robert W. J. Usher

(57) ABSTRACT

An interactive system for motion picture display of a magic show has a remote information site, such as a television station or internet web site having one of a series of cameras for recording simultaneously different views of a same motion element of a live magic show from predetermined different camera angles and a (video) recording of different views of a magic show pre-recorded simultaneously by a series of cameras set at predetermined different camera angles and television or computer for accessing at least some of the different views locally by one of line and wireless means and operable by an individual member of an audience to switch channels to switch different views for display, alternatively, on a screen, during the magic show. A view access fee can be collected. The different views may be stored on a DVD/CD or hard drive.

9 Claims, 1 Drawing Sheet

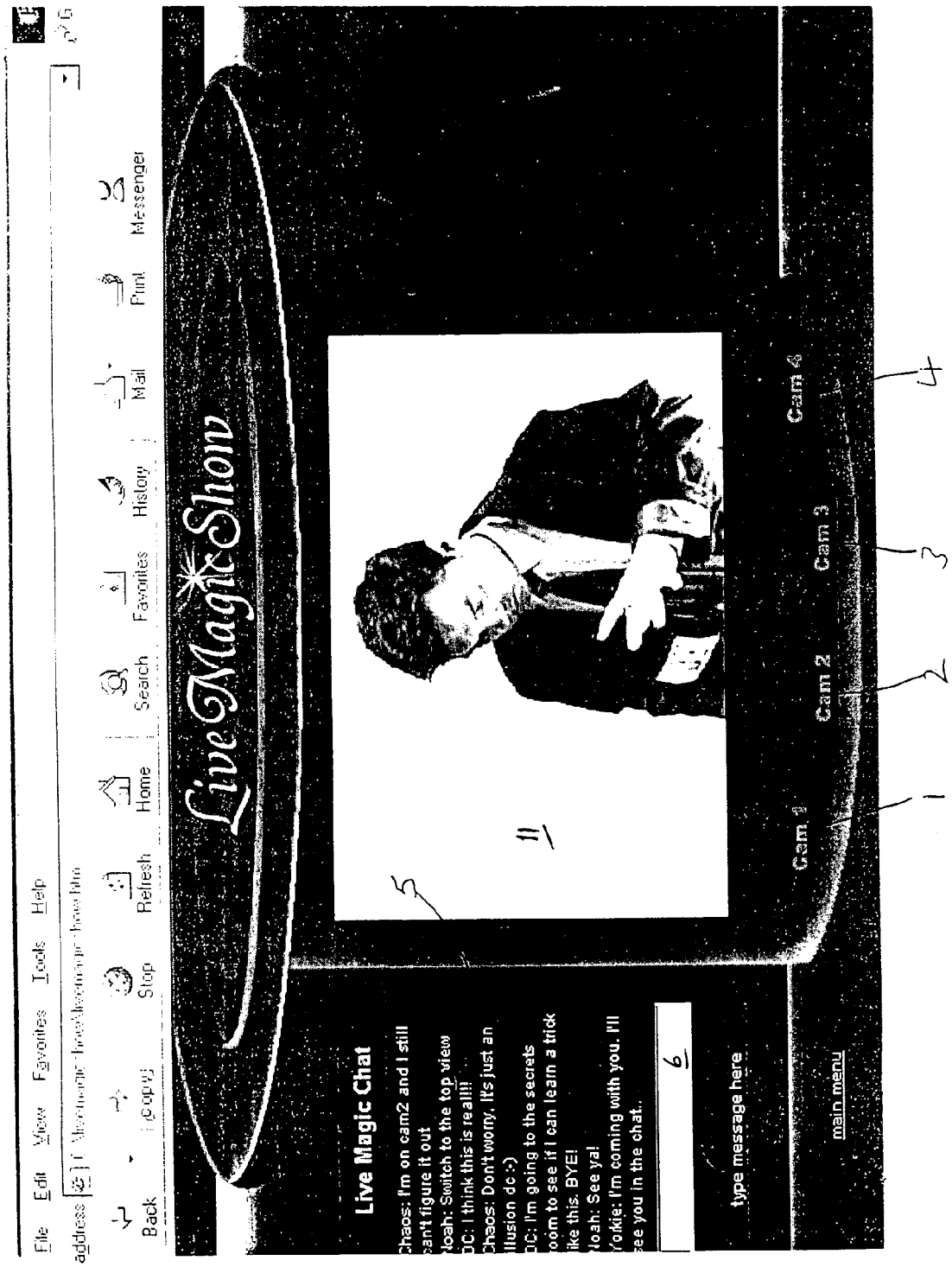

SYSTEM FOR INTERACTIVE DISPLAY OF A MAGIC SHOW

FIELD OF THE INVENTION

The invention relates to a method and system for displaying, interactively, motion elements of a magic show and for instructing the performance of magic tricks.

BACKGROUND OF THE INVENTION

Individual members of an audience watching a performance of a magic trick frequently believe that some key aspect of the trick being performed, for example, a motion element of the trick such as a surreptitious movement of the magician's hand when "palming" a card, is being concealed or masked from the spectator's view. They are often convinced that, if only they had a different view of that motion element of the trick during performance, they could guess the secret or solution underlying the magic trick. In addition, many tricks rely for their magical effect on several different spectacular aspects which cannot all be appreciated fully from a single view. Furthermore, when learning to perform a magic trick, the student magician often needs to view, or review, a particular stage of the trick from different angles to understand fully the subtleties of a magician's diverting gesture or hand movement when handling a prop.

To meet the above needs, it is desirable for different views of motion elements of the trick to be available to an individual member of the audience on demand.

Conventionally, it has been the role of the production team making a motion picture such as a television show or video to decide which one (or more) of several camera angles will be displayed to an audience at any particular time. However, even the most skillful production team cannot correctly anticipate or even appreciate the different views, desired at any particular time by every audience member, as individual requirements vary, not least according to personal learning requirement, or whim.

When a popular or important event such as a live presidential address is broadcast, different news channels will often broadcast the same event simultaneously. Thus, switching between channels will provide an individual audience member with views from different camera angles on respective different individual channels. However, this is a haphazard and circumstantial occurrence without inevitable result and out of the control of the audience.

Instructional magic videos of the prior art do not permit the audience to select a camera angle during the display or demonstration of a trick.

It is also prior art to provide so-called "dual-channel" television systems in which, while displaying a show on one channel, the viewer can select and inset, on the screen a frame/window of a different show broadcast simultaneously on a different, viewer-selected channel. However, that is for the purpose of monitoring the progress of the show on the different channel, e.g. a football game, while concentrating on the show on the main channel. The camera angles of respective individual shows cannot be selected by the viewer.

Security systems of the prior art provide selectable different camera angles of the same area of a building. Web sites can also provide different views of different locations in buildings, selectable by the user on demand.

An object of the invention is to provide a system for an interactive motion picture display of a magic show during which respective individual members of a remote audience can, select respective particular camera angles of motion elements of a magic trick from a predetermined set of different camera angles taken simultaneously of the motion elements of the magic trick for display on a screen.

The motion picture display may be provided by broadcasting from a remote site by wireless or line means, for television via different channels, or by web internet access via different pages or addresses, for example by hyperlinks, or as a locally stored video such as a CD/DVD or downloaded on a computer storage medium.

SUMMARY OF THE INVENTION

According to one aspect of the invention, in a system for broadcasting or otherwise displaying a magic show, views of motion elements of a particular trick taken from different predetermined camera angles are broadcast or displayed simultaneously on different channels, pages or addresses so that an individual member of the audience can switch between the different channels, pages or addresses to select any one or more of the views of a same motion element, precisely when desired.

For example, one camera may be focused on the magician's hands in close up; a second camera overhead providing a plan view and a third camera behind the magician providing a "backstage" view. Another camera may provide a highlighting effect of a significant portion of the displayed image, such the magician's hands, by fogging out the surrounding image.

The magic show may be accessible from a site having a chat room for a text chat or voice chat with other members of the audience or with the magician or both.

BRIEF DESCRIPTION OF THE DRAWINGS

The accompanying drawing is a schematic view of a web page forming a graphical interface.

DESCRIPTION OF PARTICULAR EMBODIMENTS

As shown in the drawing, the web page providing a grahical user interface has a central area 11 with a frame or window displaying another web page showing the performance of a magic show. Arrayed immediately below the window is a row of buttons, 1–4, marked Cam 1, Cam 2, Cam 3, Cam 4, individually clickable to change the window to different web pages displaying the same subject of the magic show taken simultaneously from respectively different camera angles. A message board 5 is located on the left hand side for live magic chat discussing possible trick secrets/solutions with a text message input or notepad area 6 immediately below previously posted text messages.

Video images corresponding to the different camera angles are stored at the web site, the images being accessible for display in the window via a hyperlink to respective web pages.

Individual members of the audience can switch between different camera angles as and when desired throughout the performance of the show and discuss the effectiveness of the different views in solving the magic trick via the chat room/message board.

In other embodiments, buttons clickable to effect additional payment for a different or premium view from a different camera angle such as a "close-up" or a "backstage" view. Buttons for bookmarking may also be provided permitting subsequent review of any stage of the trick performance.

According to another embodiment of the invention, a series of predetermined different views from different camera angles of a magic show are broadcast (by cable or wireless) over different television channels, with both the different views and their corresponding channels being identified to prospective audience members who can, on an individual basis, switch between selected channels at any time throughout the performance to watch their selected view on their own television set.

Live footage can be archived to provide an instructional library for magicians.

Contests could be held with the audience voting on possible solutions of the magic tricks for a fee.

The system includes a voice recognition device as an alternative to clicking to switch between alternative camera angles.

In another embodiment, a set of menu windows showing the magic trick at the same stage as the main window replaces the message board.

What is claimed is:

1. An interactive system for motion picture display of a magic show comprising:
    a remote information site having one of a magician performing a magic trick in a live magic show by deliberately concealing an action of a motion element of the magic trick from view at one angle while simultaneously deliberately exposing the action for view at another angle and series of cameras for recording, simultaneously, different views of a the motion element from predetermined different camera angles corresponding, respectively, to said one angle and said another angle and, a video recording of different views of a magic show prerecorded simultaneously by a series of cameras set at predetermined different camera angles, the magic show having a magician performing a magic trick by deliberately concealing an action of a motion element of the magic trick from view at one of said different camera angles while simultaneously deliberately exposing the action for view at another of said different camera angles;
    means for accessing at least some of the different views locally by one of line and wireless means and operable by an individual member of an audience to switch between different views for display, alternatively, on a screen, during the magic show;
    wherein the remote information site is one of an internet web site and internet address providing a graphical interface, accessible by one of line and wireless means and the accessing means comprises a computer terminal and
    wherein the graphical interface includes a message board and a text message input area or notepad whereby individual members of the audience in different locations can communicate with each other during the performance of the live magic show discussing effectiveness of different views in solving the magic trick and possible trick secrets/solutions.

2. An interactive system according to claim 1 wherein the remote information site is a television station broadcasting the different views simultaneously and the accessing means comprise a television receiver.

3. An interactive system according to claim 2 wherein the television station broadcasts the different views simultaneously on different channels so that the individual viewer can display different views by switching between the different channels.

4. An interactive system according to claim 1 wherein access to different views from different camera angles is via one of different web pages and addresses.

5. An interactive system according to claim 1 wherein means are provided to pay an additional fee for accessing a view at an angle which exposes the action.

6. A method of merchandising a magic show comprising the steps of:
    providing a remote information site accessible locally by one of wireless and line means, the remote information site having one of a series of cameras for recording simultaneously motion pictures having different views of a live magic show from predetermined different camera angles in which magic show a magician performs a magic trick by deliberately concealing an action of a motion element of the magic trick from view at one of said different camera angles while simultaneously deliberately exposing the action for view at another of said different camera angles and, a motion picture recording of different views of a magic show in which a magician performs a magic trick by deliberately concealing an action of a motion element of the magic trick from view at one camera angle while simultaneously deliberately exposing the action for view at another camera angle, different from said one camera angle, said different views having been recorded simultaneously by a series of cameras set at predetermined different camera angles;
    providing local access to an audience to at least selected different views by one of line and wireless means whereby for payment of a fee, an individual member of the audience can, during run of the motion picture, switch between different views for display, alternatively, on a screen; and
    providing a graphical interface associated with the information site having a message board/chat room whereby individual members of the audience in different locations can communicate with each other during the performance of the live magic show discussing effectiveness of different views in solving the magic trick.

7. A method for displaying a magic trick of a magic show to respective individual members of an audience at respective different remote locations comprising the steps of:
    performing a magic trick in a live magic show by deliberately concealing an action of a motion element of the magic trick from view at one angle while simultaneously deliberately exposed the action to view at another angle;
    providing motion pictures of a first view and a second view of the subject taken simultaneously from predetermined different camera angles corresponding, respectively, to said one angle and to said another angle;
    providing access for payment to the different views alternatively to the respective individual members of the audience on individual member demand at the respective different remote locations, whereby respective individual members of the audience can switch between the different views during motion picture performance; and, providing a graphical interface associated with the information site having a message board/chat room whereby individual members of the audience in different locations can communicate with each other during the performance of the live magic show discussing effectiveness of different views in solving the magic trick.

8. A system for displaying performance of a magic trick of a magic show in which magic trick a magician deliberately conceals an action of a motion element of the magic trick from view at one set of different angles while simultaneously deliberately exposing the action indicative of a solution of the methodology of the magic trick for view at second set of angles differing both from each other and from the first set of angles, comprising the steps of providing a first set of motion pictures and a second set of motion pictures of the magic trick, the motion pictures of each set showing different views of a same magic trick taken simultaneously from predetermined different camera angles, the motion pictures of the first set being views of the magic trick taken, simultaneously, from at least two different camera angles displaying an impression of the performance of the trick and, the motion pictures of the second set being views of the magic trick taken, simultaneously, from at least two different camera angles exposing a solution of methodology of the magic trick, means for individual members of an audience to switch between the first set of motion pictures and the second set of motion pictures, as and when they wish to compare the impression of the performance of the magic trick with the methodology of the magic trick, and, means providing a graphical interface associated with the information site having a message board/chat room whereby individual members of the audience in different locations can communicate with each other during the performance of the live magic show discussing effectiveness of different views in solving the magic trick.

9. A system for enabling interaction between individual members of an audience at different locations when viewing a real time performance of a magician in a magic show comprising a remote information site having multiple cameras recording simultaneously respective different views of the performance from different camera angles providing a local graphical access to the individual members of the audience for individual member selection of different views during the performance for payment of a fee and a message/chat board whereby individual members of the audience can select different views during real time whereby individual members of the audience in different locations can communicate with each other during the performance of the live magic show discussing effectiveness of different views in solving the magic trick.

* * * * *